(12) United States Patent
Conroy et al.

(10) Patent No.: US 11,029,679 B2
(45) Date of Patent: *Jun. 8, 2021

(54) REMOTE PUMPING STATION MONITORING

(75) Inventors: James Conroy, Indooroopilly (AU); Jeremy Doktor, Pacific Pines (AU); Robert Manthey, Corinda (AU)

(73) Assignee: MULTITRODE PTY LTD.

( * ) Notice: Subject to any disclaimer, the term of this patent is extended or adjusted under 35 U.S.C. 154(b) by 615 days.

This patent is subject to a terminal disclaimer.

(21) Appl. No.: 12/358,751

(22) Filed: Jan. 23, 2009

(65) Prior Publication Data

US 2009/0187382 A1 Jul. 23, 2009

(30) Foreign Application Priority Data

Jan. 23, 2008 (AU) .............................. 2008900307
Oct. 16, 2008 (AU) .............................. 2008229982

(51) Int. Cl.
G05B 23/02 (2006.01)

(52) U.S. Cl.
CPC ...... G05B 23/0267 (2013.01); *G05B 2223/06* (2018.08)

(58) Field of Classification Search
CPC ..................... G05B 23/0267; G05B 2219/13
USPC ........................... 702/188, 122, 123
See application file for complete search history.

(56) References Cited

U.S. PATENT DOCUMENTS

| | | | |
|---|---|---|---|
| 6,178,393 B1* | 1/2001 | Irvin .............................. | 703/10 |
| 6,391,623 B1* | 5/2002 | Besemer et al. .......... | 435/287.2 |
| 6,553,336 B1 | 4/2003 | Johnson et al. | |
| 7,221,939 B2* | 5/2007 | Ylitalo et al. ............. | 455/435.1 |
| 7,860,583 B2* | 12/2010 | Condurso et al. ................ | 700/2 |
| 8,774,972 B2* | 7/2014 | Rusnak ............... | F04D 15/0066 |
| | | | 415/122.1 |
| 2002/0109592 A1* | 8/2002 | Capano et al. ............... | 340/540 |
| 2003/0217100 A1 | 11/2003 | Kronk | |
| 2008/0006089 A1* | 1/2008 | Adnan ..................... | F04B 51/00 |
| | | | 73/587 |
| 2008/0131290 A1* | 6/2008 | Magoon et al. ................ | 417/38 |
| 2008/0208603 A1* | 8/2008 | Lopez .................... | G06Q 10/00 |
| | | | 705/1.1 |
| 2008/0306437 A1* | 12/2008 | Jacobson .............. | A61M 5/142 |
| | | | 604/67 |
| 2010/0131083 A1* | 5/2010 | Leany ................. | H02P 23/0027 |
| | | | 700/83 |
| 2010/0162812 A1* | 7/2010 | Parkinson ....................... | 73/299 |
| 2013/0108478 A1* | 5/2013 | Parkinson ....................... | 417/53 |

\* cited by examiner

*Primary Examiner* — Alexander Satanovsky
(74) *Attorney, Agent, or Firm* — Hunter Clark PLLC

(57) ABSTRACT

The present invention relates to a monitoring method for monitoring a remote pumping station in communication with a computational device via the Internet. An embodiment of a method may comprise requesting, using the computational device, pumping station information from the pumping station. The pumping station information may then be received by the computational device. The pumping station information may be in the form of a pumping station profile. In one embodiment, information from the pumping station profile is displayed on a display of the computational device. The information displayed would typically comprise the water level, and indicators of the activation set points and deactivation set points for the pumps.

7 Claims, 9 Drawing Sheets

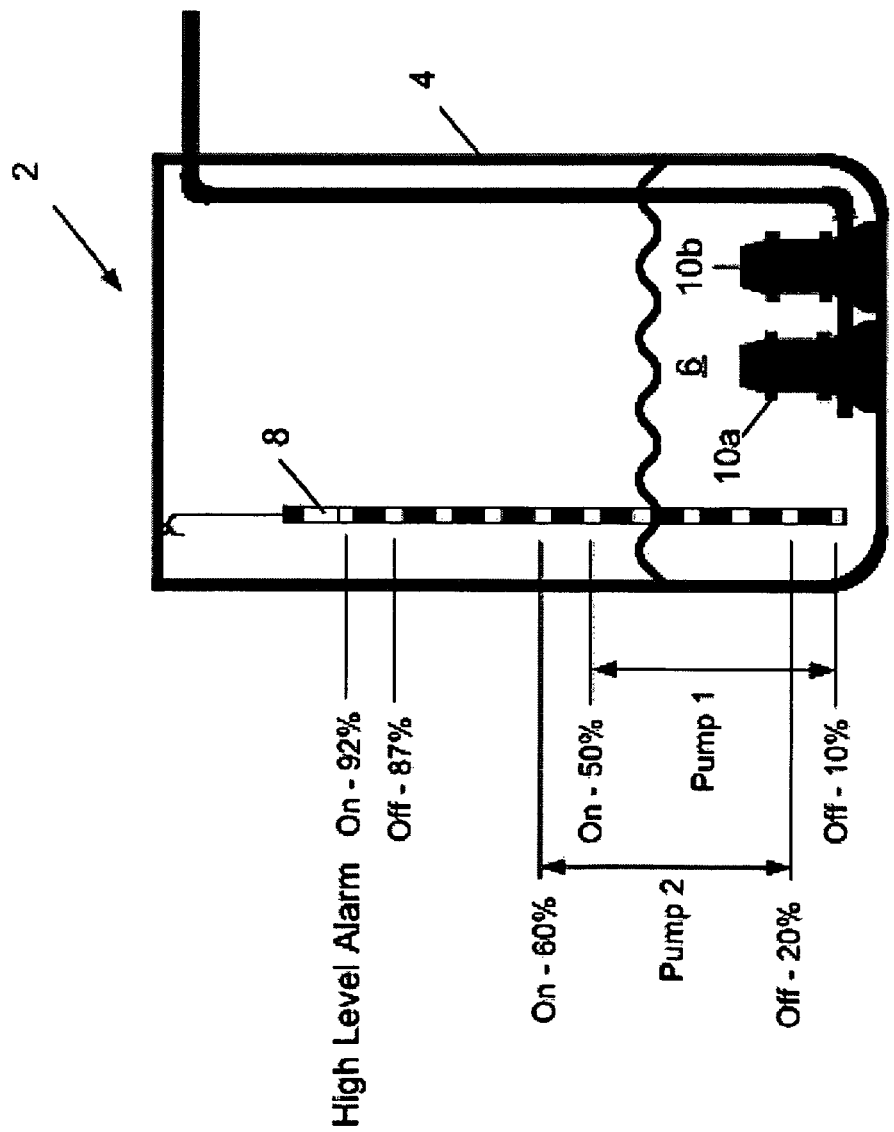

REMOTE PUMPING STATION MONITORING

TECHNICAL FIELD

The present invention generally relates to pumping stations. The present invention has particular, although not exclusive application to waste water pumping stations.

BACKGROUND

The reference to any prior art in this specification is not, and should not be taken as an acknowledgement or any form of suggestion that the prior art forms part of the common general knowledge.

Pumping stations 2 for emptying sewage wells (FIG. 1A) and filling water wells (FIG. 1B) are known. These pumping stations 2 typically include a well 4 in which liquid 6 is located, a level sensor 8 for sensing the liquid level in the well 4, a pair of pumps 10a, 10b for pumping liquid into or out of the well 4 as required, and a controller (not shown) in communication with sensor 8 and for controlling the operation of the pumps 10a, 10b based on the sensed liquid level in the well 4. FIG. 1 shows various level trigger-points along the level sensor 8 in the form of electrodes. The controller independently activates or de-activates the pumps 10a, 10b with hysteresis in response to it sensing the liquid level via the level sensor 8.

In practice, the pumping stations 2 can be located in isolated and remote locations, and are not typically manned. There is a need for a suitable method for monitoring these remote pumping stations.

SUMMARY OF THE INVENTION

According to an aspect of the present invention, there is provided a method for monitoring a remote pumping station in communication with a computational device via the Internet, the method comprising:
  requesting, using the computational device, a pumping station profile from the pumping station, the pumping station profile comprising a plurality of parameters relating to the pumping station; and
  receiving, with the computational device, the pumping station profile.

Said requesting may involve periodically requesting the pumping station profile from the pumping station. Said requesting may involve requesting the pumping station profile responsive to the receipt of user input.

The pumping station profile may comprise any one or more of the following parameters: the mode of operation of the pumping station; the number of pumps of the pumping station; the activation set point of each pump; the deactivation set point of each pump; detectable faults for each pump; level alarms based on levels measured by each level sensor; the number of wells of the pumping station; and detectable faults for the pumping station. The parameters may be operational and/or configuration parameters of the pumping station.

The method may further comprise updating, using the computational device, the pumping station profile. Said updating may involve previewing, using the computational device, a number of possible pumping station profiles; and selecting one of the possible pumping profiles. The method may further comprise sending, using the computational device, the updated pumping station profile to the pumping station.

The method may further comprise displaying information from the pumping station profile on a display of the computational device. Said displaying may involve displaying the water level, and indicators of the activation set points and deactivation set points for the pumps.

According to a further embodiment, there is provided the computational device configured to perform any one or more of the preceding methods. In one embodiment, the computational device is a personal computer (PC).

According to another embodiment, there is provided a response method for a remote pumping station in communication with a computational device via the Internet, the method comprising:
  receiving, from the computational device and with a pump controller of the pumping station, a request for a pumping station profile, the pumping station profile comprising a plurality of parameters relating to the pumping station; and
  sending, from the pump controller and to the computational device, the pumping station profile.

Prior to said sending, the method may further comprise re-configuring pumps of the pumping station and updating, in a memory of the pump controller, the pumping station profile to be sent.

According to a further embodiment, there is provided a storage media, such as a magnetic or optical disk or solid state memory, containing computer readable instructions for execution by a processor to thereby perform any one or more of the preceding methods.

According to a further embodiment, there is provided the pump controller configured to perform any one or more of the preceding methods.

According to a further embodiment, there is provided a pump controller for a remote pumping station, the pump controller configured to:
  receive, from a computational device via the Internet, a request for a pumping station profile, the pumping station profile comprising a plurality of parameters relating to the pumping station; and
  send, to the computational device via the Internet, the pumping station profile.

According to yet a further embodiment, there is provided a pump controller for a remote pumping station, the pump controller comprising:
  a processor in communication with ports for connection to pumps, and in communication with a communications port for connection to a communications device; and
  a memory either on-board or in communication with the processor, the memory containing a software product comprising:
    routines for receiving, from a computational device via the Internet and the communications device, a request for a pumping station profile, the pumping station profile comprising a plurality of parameters relating to the pumping station; and
    routines for sending, to the computational device via the Internet and the communications device, the requested pumping station profile.

BRIEF DESCRIPTION OF THE DRAWINGS

Features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1a is a schematic diagram of a pumping station for emptying a sewage well;

DETAILED DESCRIPTION OF EMBODIMENTS

Figure 2:
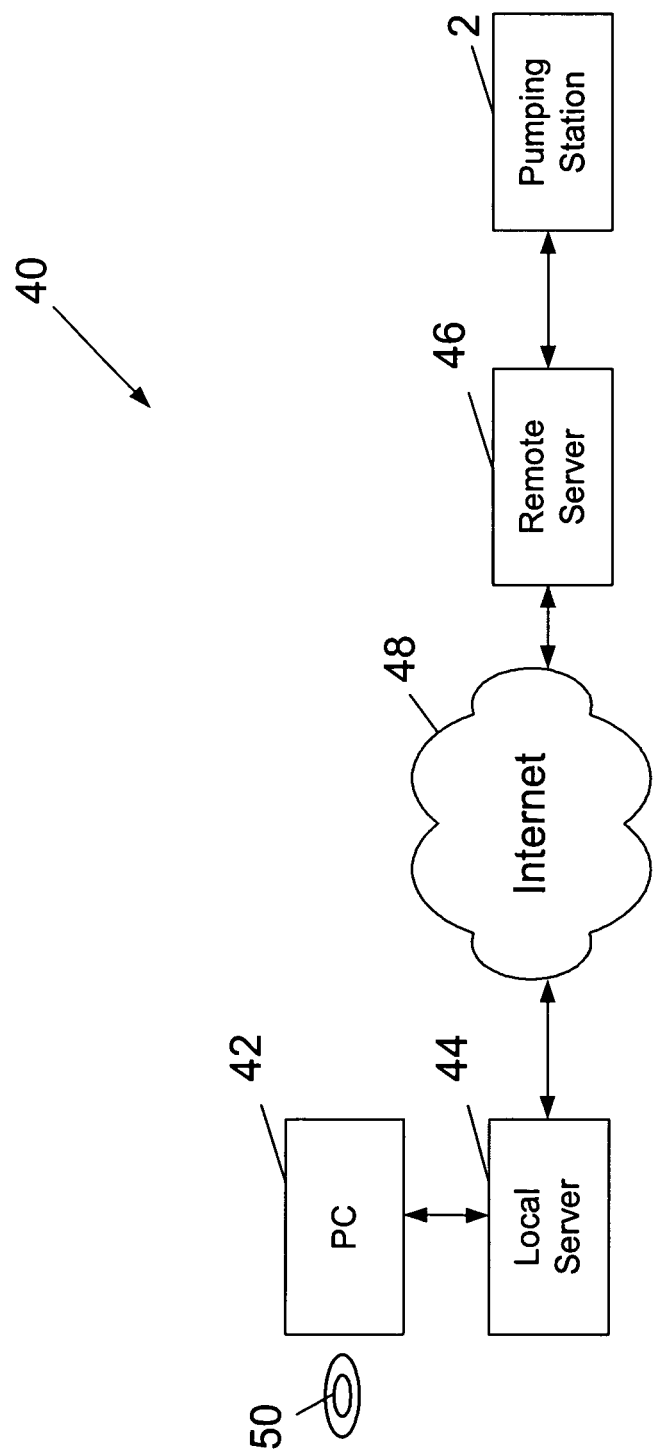
FIG. 2 is a schematic diagram of a hosted system for controlling a remote pumping station in accordance with an embodiment of the present invention.

An embodiment of the present invention will now be described with reference to a hosted system 40 for controlling a remote pumping station 2 and shown in FIG. 2. The system 40 comprises a Personal Computer (PC) 42 which is interfaced to a local server 44. In turn, the local server 44 is connected in communication with a remote server 46 via the Internet 48. The remote server 46 is located at the pumping station 2.

A pumping station supervisor (not shown) can monitor the remote pumping station 2 using the PC 42 without the need to travel to the pumping station 2. A monitoring software product comprises instructions for PC 42 to perform a monitoring method 70 for monitoring the remote pumping station 2 as explained in detail below with reference to FIG. 5. The monitoring software product (comprising software routines) is typically provided on a medium such as a magnetic or optical disc 50 which can be loaded onto PC 42 by means of a disc drive. Alternatively, the monitoring software product can be downloaded to PC 42 via the Internet 48. The monitoring software product contains computer readable instructions for execution by a processor of the PC 42.

Figure 3:
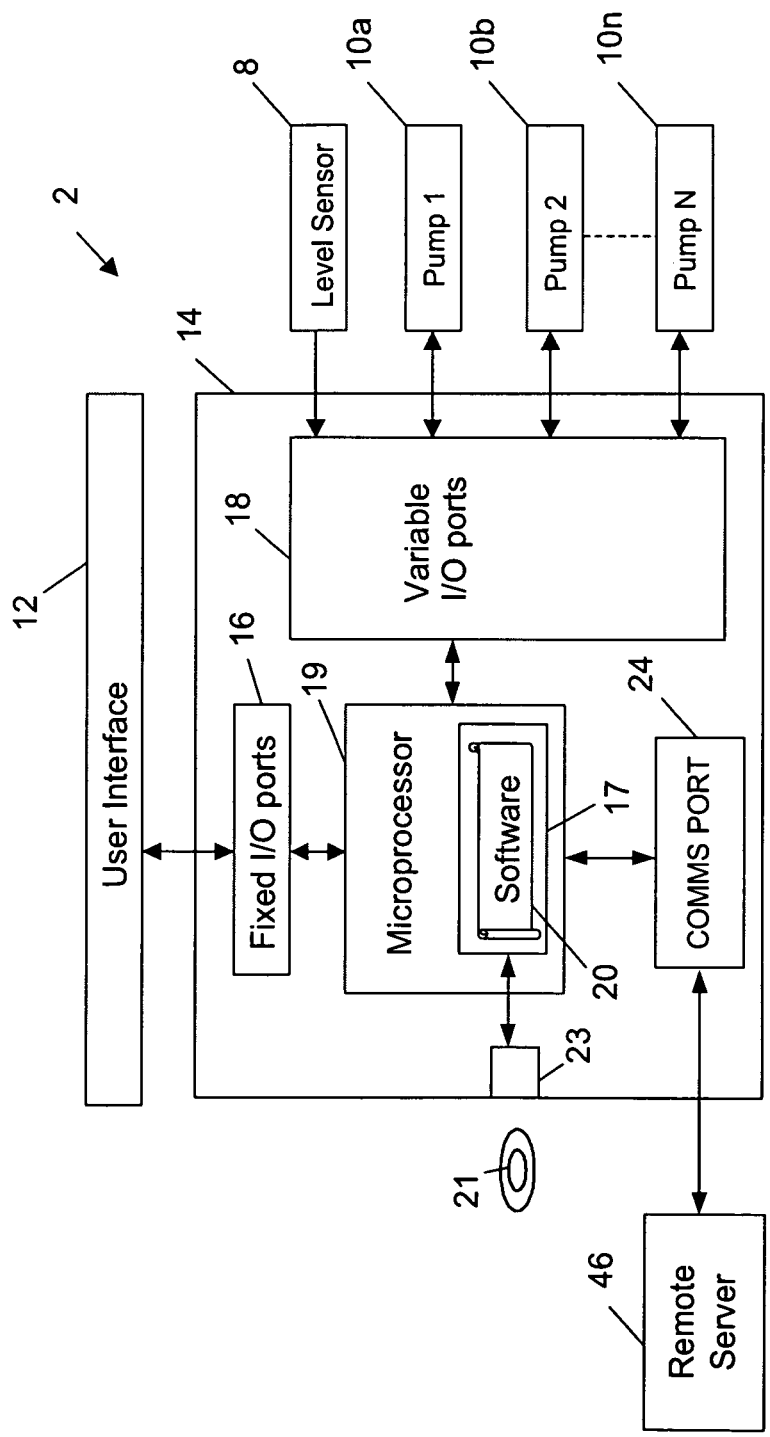
FIG. 3 is a block diagram showing a pump controller of the pumping station shown in FIG. 2.

A controller 14 of the pumping station 2 is shown in FIG. 3. As previously discussed, the pumping station 2 comprises a level sensor 8 for sensing the liquid level in a well 4, and a pair of pumps 10a, 10b (e.g. variable speed drive (VFD) three-phase pumps) for pumping liquid into or out of the well 4 as required. The controller 14 is suitable for controlling the operation of the pumps 10 based on the sensed liquid level in the well. A user interface 12 is provided to enable a remote user (e.g. a maintenance worker reconfiguring the pumping station 2) to input data to the controller 14 and review controller data relating to the operation of the pumping station 2 on a display. The user interface 12 is fixedly wired to fixed input/output (I/O) ports 16 of the controller 14 which, in turn, are interfaced using suitable circuitry to a microprocessor 19 that executes a pumping station software product 20.

Figure 7:
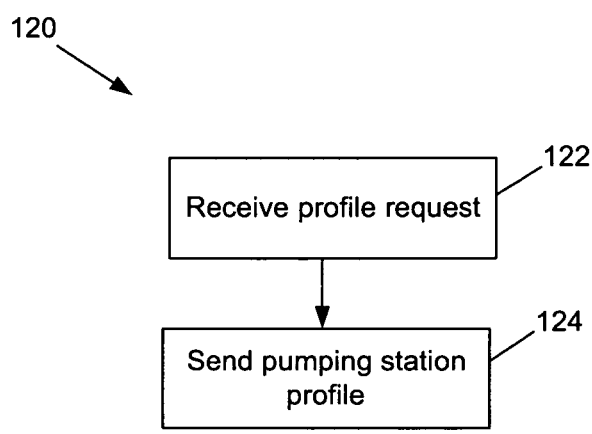
FIG. 7 is a flowchart showing a response method performed by the pump controller shown in FIG. 3.

The level sensor 8 and pumps 10 are wired to variable I/O ports 18 of the controller 14 which, in turn, are interfaced using suitable circuitry to the microprocessor 19. The wiring configuration between the variable I/O ports 18 and the peripheral hardware is prone to variation depending upon the type of peripheral hardware (e.g. level sensor 8, pumps 10, etc.) used in the pumping station 2. The pumping station software product 20 comprises instructions for processor 19 to perform a response method 120 (see. FIG. 7) for responding with pumping station configuration information subsequent to receiving a configuration information request from the pumping station supervisor using PC 42. Pumping station software product 20 (comprising software routines) is typically provided as firmware in an integrated circuit memory device 17 or on a magnetic or optical disc 21 which microprocessor 19 can access by means of disc drive 23. The software product 20 contains computer readable instructions for execution by the processor 19.

The processor 19 is coupled in communication with a communications port 24 which, in turn, is connected to the remote server 46. The pumping station software product 20 comprises routines for receiving, from the PC 42 via the Internet 48 and the servers 44, 46, a request from the supervisor for pumping station configuration information relating to the pumping station 2. The pumping station software product 20 further comprises routines for sending, to the PC 42 via the Internet 48 and the servers 44, 46, the requested pumping station configuration information.

Figure 4:
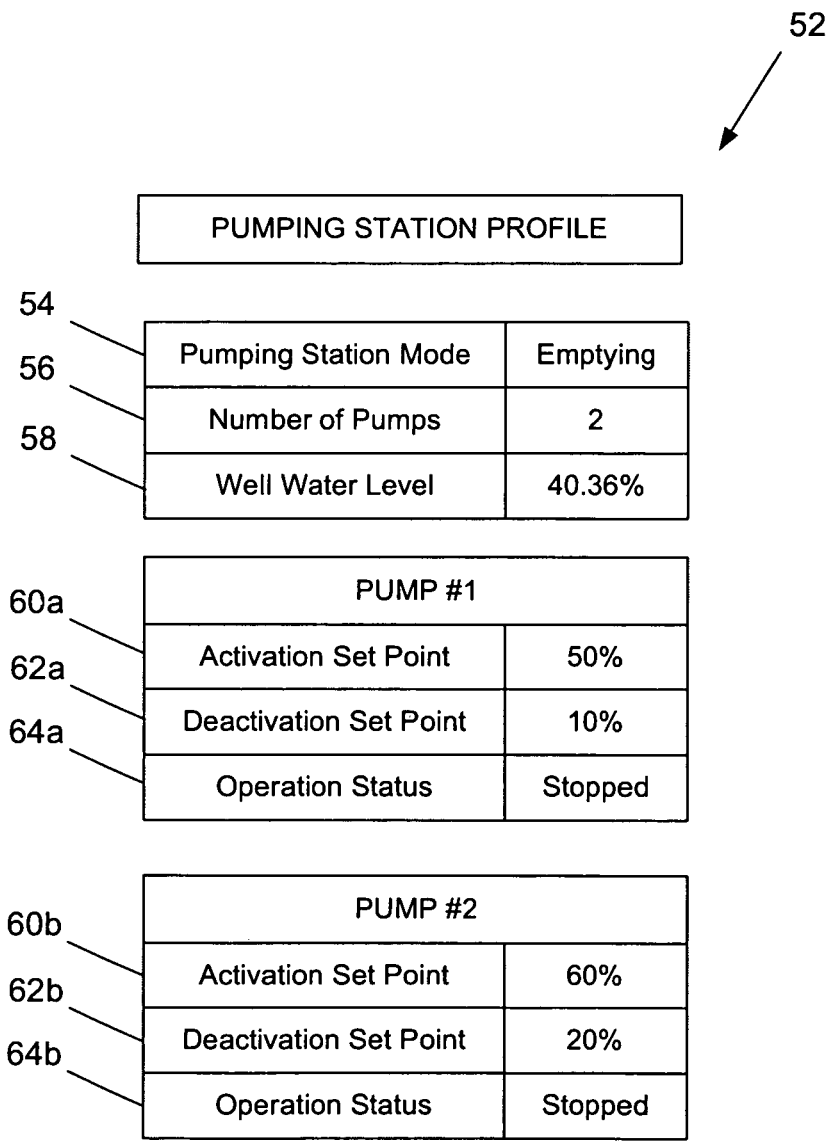
FIG. 4 is an example of a pumping station profile of the pumping station shown in FIGS. 1a and 2.

Turning to FIG. 4, the pumping station configuration information is in the form of a pumping station profile 52. The pumping station profile 52 comprises the following configuration variables or parameters: the mode of operation 54 of the pumping station 2 (i.e. filling or emptying); the number of pumps 56 of the pumping station 2; the water level 58 of a well 4 of the pumping station 2; the activation set point 60 of each pump 10; the deactivation set point 62 of each pump 10; and each pump's operational status 64 (i.e. running or stopped). Although not shown in FIG. 4, the pumping station profile 52 can further comprise the following operational variables or parameters: detectable faults associated with each pump 10; level alarms based on levels measured by each level sensor 8; the number of wells 4 of the pumping station 2; and detectable faults associated with the pumping station 2. The active pumping station profile 52 is stored in the memory 17 of pump controller 14.

In use, pump controller 14 periodically senses the well water level with level sensor 8 and updates the well water level 58 of the pumping station profile 52. The pump controller 14 controls the pumps 14 based upon information in the stored pumping station profile 52. In particular, the pump controller 14 controls the operation of the pumps 10a, 10b based on the sensed liquid level in the well 4 and the stored set points 60, 62, and sets the operational status 64 of each pump 10 in the pumping station profile 52. The mode of operation 54, the number of pumps 56, and the set points 60, 62 of the pumping station profile 52, can be adjusted by either the pumping station supervisor using PC 42 or the maintenance worker using user interface 12.

Figure 5:
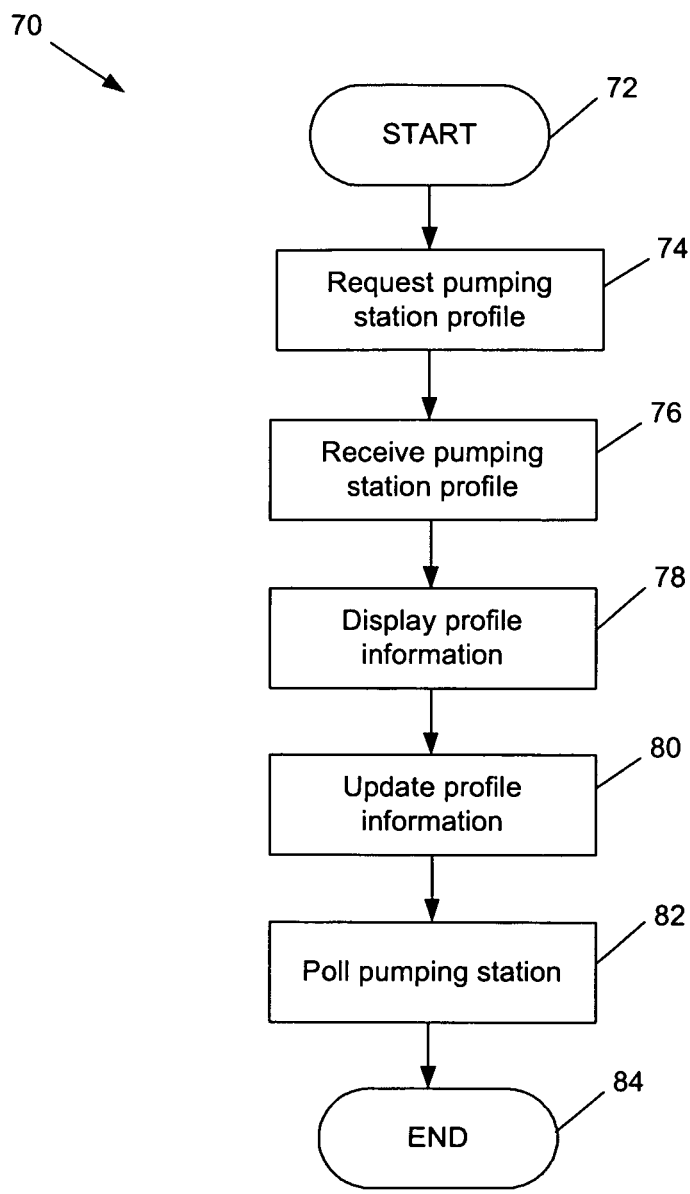
FIG. 5 is a flowchart showing a method for monitoring the pumping station performed by the PC shown in FIG. 2.

According to an embodiment of the present invention, there is provided a monitoring method 70 for monitoring the remote pumping station 2 as shown in FIG. 5. The method 70 is performed using PC 42.

The method begins at element 72 when the pumping station supervisor executes the monitoring software product on the PC 42.

Upon executing the monitoring software product and at element 74, the PC 42 requests the pumping station profile 52 from the pump controller 14 of the pumping station 2. In this manner, a profile request message is sent by PC 42 to pump controller 14 via the Internet 14 and servers 44, 46.

At element 76, the PC 42 receives the pumping station profile 52 sent from the pump controller 14.

Figure 6:
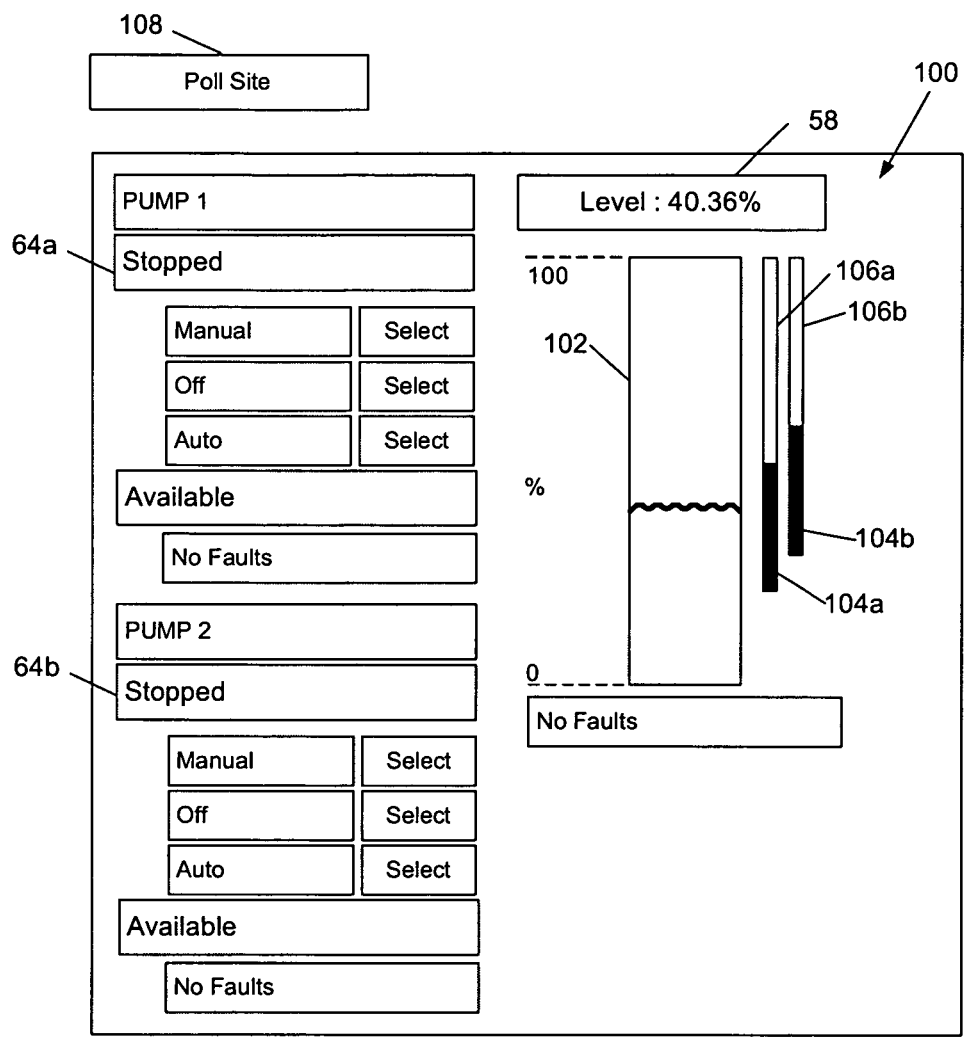
FIG. 6 is a schematic drawing of a graphical user interface (GUI) displayed on a display of the PC shown in FIG. 2, the GUI displaying information from the exemplary pumping station profile of FIG. 4.

At element 78, the PC 42 displays information from the received pumping station profile 52, on its display and in a graphical user interface (GUI) 100 as shown for example in FIG. 6.

Figure 1B:
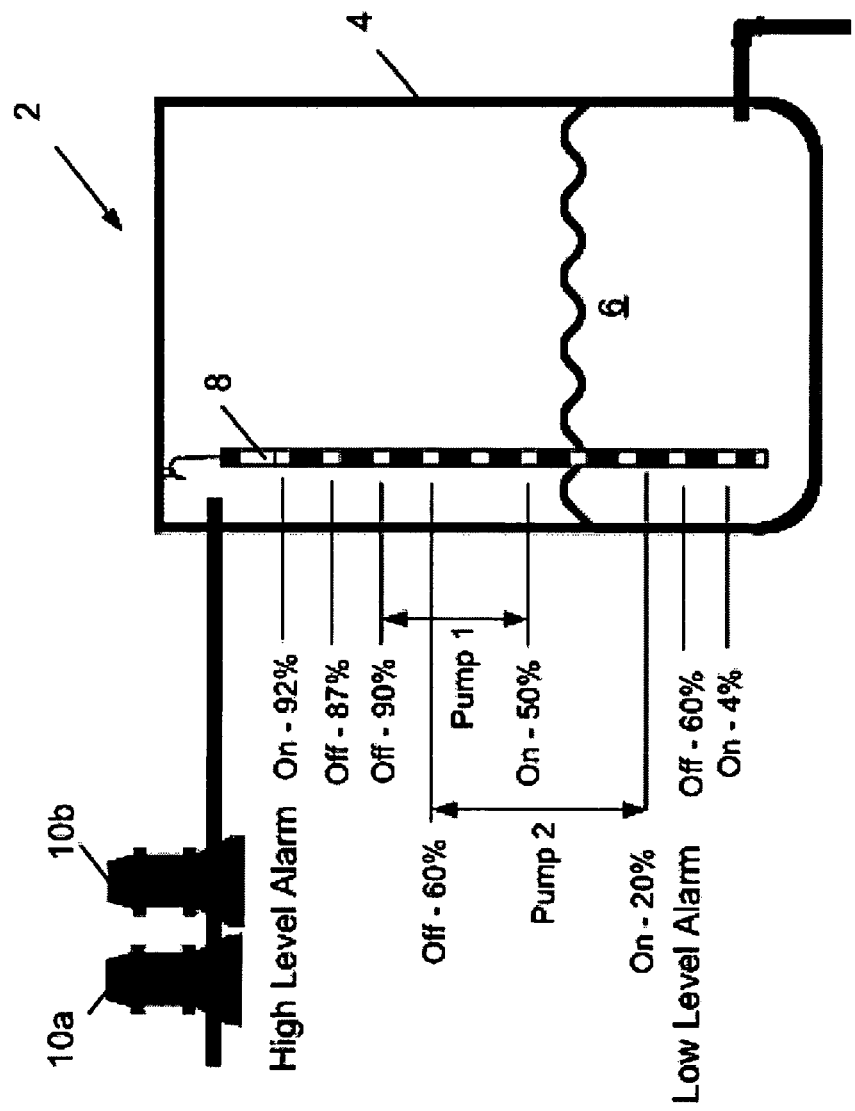
FIG. 1b is a schematic diagram of a pumping station for filling a water well.

The particular GUI 100 shown in FIG. 6 is displaying information for the pumping station 2 configured to empty the sewage well 4 shown in FIG. 1A, and having the pumping station profile 52 shown in FIG. 4. The GUI 100 displays the operation status 64 of each pump 10 and the well water level 58. A well graphic 102 is also displayed which shows a representation of the well 4 containing the liquid 6 in accordance with the dynamic water level 58, and a percentage full indicator to the left of the well. A pair of shaded bars 104a, 104b is displayed to the right of the well graphic 102 and correspond to respective pumps 10a, 10b. The top end of each shaded bar 104 corresponds to the activation set point 60 and the bottom end of each shaded bar corresponds to the deactivation set point 62.

Furthermore, a pair of active indicator bars 106a, 106b is located above respective shaded bars 104a, 104b. The active indicator bars 106a, 106b show the level of the liquid at which corresponding pumps 10a, 10b are activated. The supervisor can readily ascertain from glancing at the GUI 100 that the mode of operation 54 of the pumping station 2 is set to "emptying", because the pumps 10a, 10b are to be activated when the dynamic liquid level displayed in the well of the well graphic 102 is in register with respective active indicator bars 106a, 106b.

Returning to FIG. 5 and at element 80, the supervisor can optionally use the PC 42 to change and update information in the pumping station profile 52 stored in the memory 17 of the pump controller 14. As previously explained, the pump controller 14 controls the pumps 14 based upon information in the stored pumping station profile 52.

The pump controller 14 controls the operation of the pumps 10a, 10b based on the sensed liquid level in the well 4 and the stored set points 60, 62, and sets the operational status 64 of the pumping station profile 52. When updating the pumping station profile 52, the pumping station supervisor can firstly preview, using the PC 42, a number of possible pumping station profiles stored in a profile register (not shown) in the memory of PC 42. Each profile appears similar to GUI 100, but comprises unique set points 60, 62 represented by shaded bars 104a, 104b. Once the supervisor is satisfied that a particular possible profile better suits the current operating conditions of the pumping station 2 (e.g. well water level 58), and the PC 42 verifies that that profile complies with safety rules and can be safely implemented, the supervisor can then use the PC 42 to select that possible profile. The selected and updated profile is then sent, using the PC 42, and is stored as the active pumping station profile 52 in controller 14.

At element 82, the supervisor can optionally select a POLL input command 108 displayed on the GUI 100 with a mouse of PC 42. In this event, the PC 42: requests the pumping station profile 52, receives the pumping station profile 52 and displays the pumping station profile 52 in a similar way to the method explained above with reference to elements 74 to 78.

Alternatively, the PC 42 automatically and periodically (e.g. once per hour) requests: the pumping station profile 52, receives the pumping station profile 52 and displays the pumping station profile 52 in a similar way to the method explained above with reference to elements 74 to 78.

At element 84, the supervisor can select an appropriate option to exit (i.e. shut down) the monitoring software product.

As briefly explained above, the pumping station software product 20 comprises instructions for the pump controller 14 to perform the response method 120 shown in FIG. 7. The response method 120 is described in detail below.

At element 122, the pump controller 14 receives the profile request message which was sent from the PC 42 during element 74 of monitoring method 70 shown in FIG. 5.

At element 124, the pump controller 14 retrieves the pumping station profile 52 from memory 17 and sends it to PC 42. As explained above, PC 42 then receives the sent pumping station profile 52 at element 76 of monitoring method 70 shown in FIG. 5.

A maintenance worker may upgrade the pumping station 2 by, for example, re-configuring the pumps and adding an additional pump 10. In this event, the maintenance worker can accordingly adjust the pumping station profile 52 stored in the controller 14 using the user interface 12. The maintenance worker may adjust the mode of operation 54, the number of pumps 56, and the set points 60, 62 of the pumping station profile 52. Alternatively, the supervisor may use PC 42 to adjust the profile 52. The next time that the controller 14 receives a profile request message at element 122, the controller 14 sends the adjusted (and newly stored) pumping station profile 52 to PC 42 at element 124. The PC 42 then refreshes the GUI 100 to display information from the adjusted pumping station profile 52.

Similarly, when the monitoring method 70 is first performed to monitor a pumping station 2, the PC 42 automatically refreshes the GUI 100 to adequately display information from the newly acquired pumping station profile 52 based on, for example, the number of pumps 10 at the pumping station 2.

A person skilled in the art will appreciate that many embodiments and variations can be made without departing from the ambit of the present invention.

One embodiment was described with reference to two pumps 10a, 10b. The skilled person would readily understand that the pumping station 2 in other embodiments could readily comprise more than two pumps.

Furthermore, one embodiment was described with reference to an example where the mode of operation 54 of the pumping station 2 was set to "emptying".

In an alternative embodiment, the mode of operation 54 may be set to "filling", whereby the active indicator bars 106a, 106b are located below respective shaded bars 104a, 104b. In this instance, the bottom end of each shaded bar 104 corresponds to the activation set point 60 and the top end of each shaded bar corresponds to the deactivation set point 62.

In one embodiment, the pumping station supervisor could update the pumping station profile 52 by firstly previewing a number of possible pumping station profiles and then selecting one of the possible profiles. In alternative embodiments, the supervisor may use PC 42 to manually adjust and update respective variables (e.g. set points 60, 62) stored within the pumping station profile 52 at controller 14.

One embodiment was described with reference to a single PC 42 in communication with a single controller 14 of a pumping station 2 via the Internet. In an alternative embodiment, more than one PC may be in communication with the controller 14 via the Internet. In yet another embodiment, the PC 42 may be in communication with a plurality of controllers at respective pumping stations so that the supervisor can monitor those pumping stations using PC 42.

In one embodiment described in detail above, the pumping station profile 52 comprised the following variables: well water level 58 and pump operation status 64. In an alternative embodiment, theses variable may not be included in the profile 52, and could instead be sent from the controller 14 to the PC 42 in a separate data structure (e.g. with pumping station operational status message).

Figure 8:
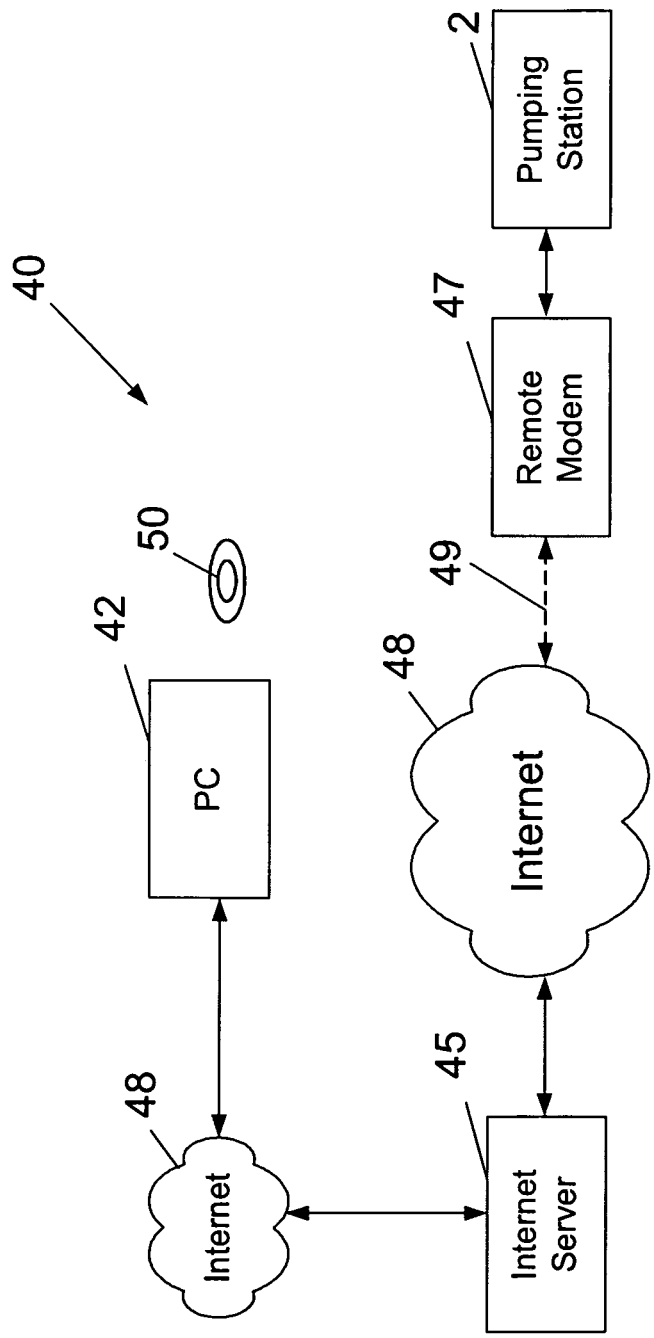
FIG. 8 is a schematic diagram of a hosted system for controlling a remote pumping station in accordance with another embodiment of the present invention.

In an alternative embodiment, the hosted system 40 may comprise a wireless communications link 49 between the PC 42 and controller 14 as shown in FIG. 8. The PC 42 is in communication with an intermediate Internet server 45 using a Secure Sockets Layer (SSL) over the Internet 48. The intermediate server 45 comprises a central storage facility for storing pumping station profiles 52 sent from various pumping stations. Authorized PC users at various locations can access the central storage facility of intermediate server 45 using the SSL, and view information from the pumping station profiles 52 in the central storage facility via the Internet 48. The intermediate server 45 effectively forms a local Supervisory Control and Data Acquisition (SCADA) system.

In addition, the intermediate server 45 is in communication with a remote wireless modem 47 via a Virtual Private Network (VPN) over the Internet 48. A wireless cellular phone link 48 is located between the Internet 48 and the remote modem 47. In turn, the remote modem 47 is coupled to the controller 14 of the pumping station 2.

In one embodiment, the PC 42 may also be loaded with a control software product configured to control the operation of the pumping station 2. Upon receiving the pumping station profile 52, the PC 42 can configure the control software product in accordance with the received pumping station profile 52 so that a PC user can then control the operation of the pumping station 2 using the PC 42. For example, the PC user may adjust the operational status of the pumps 10 (i.e. on of off), display or adjust relevant alarms for each pump 10, and adjust the conditions under which pump alarms are generated. Advantageously, the operation of the pumping station 2 may be affected without the need to reconfigure (or re-program) the local SCADA system of the intermediate server 45.

In compliance with the statute, the invention has been described in language more or less specific to structural or methodical features. It is to be understood that the invention is not limited to specific features shown or described since the means herein described comprises various forms of putting the invention into effect. The invention is, therefore, claimed in any of its forms or modifications within the proper scope of the appended claims appropriately interpreted by those skilled in the art.

What is claimed is:

1. A method for monitoring and operating a plurality of remote pumping stations, the method comprising:
   requesting, using a computational device, a pumping station profile from the remote pumping station, the pumping station profile including:
      a mode of operation of a pumping station including a filling mode and an emptying mode;
      an indication of well water level for the pumping station;
      an activation set point for at least one pump in the pumping station;
      a deactivation set point for the at least one pump in the pumping station;
      one or more level alarms associated with the well water level;
   wherein the computational device is configured to receive pumping station profiles from a plurality of remote pumping stations;
   receiving, with the computational device and in response to requesting the pumping station profile, the pumping station profile;
   updating based on current operating conditions, using the computational device, the pumping station profile based on a user selected one of a number of possible pumping station profiles to produce an updated pumping station profile;
   sending, using the computational device via the Internet, the updated pumping station profile to the remote pumping station;
   reconfiguring the remote pumping station to operate according to the updated pumping station profile by updating a configuration of a controller of the remote pumping station according to the updated pumping station profile; and
   operating, using the controller, the at least one pump and at least one sensor of the remote pumping station according to the updated pumping station profile.

2. The method as claimed in claim 1, wherein requesting comprises periodically requesting the pumping station profile from the remote pumping station.

3. The method as claimed in claim 1, wherein requesting comprises requesting the pumping station profile responsive to receipt of input from the user.

4. The method as claimed in claim 1, wherein updating comprises previewing, using the computational device, possible pumping station profiles prior to selecting one of the possible pumping station profiles.

5. The method as claimed in claim 1, further comprising displaying information from the pumping station profile on a display of the computational device to provide monitoring of the operating parameters of the remote pumping station to which the remote pumping station is actively configured to operate.

6. The method as claimed in claim 5, wherein displaying comprises graphically displaying a water level, and indicators of the activation set points and deactivation set points for the at least one pump.

7. A computational device configured to:
   request a pumping station profile from a remote pumping station, the pumping station profile including:
      a mode of operation of a pumping station including a filling mode and an emptying mode;
      an indication of well water level for the pumping station;
      an activation set point for at least one pump in the pumping station;
      a deactivation set point for the at least one pump in the pumping station;
      one or more level alarms associated with the well water level;
   wherein the computational device is configured to receive pumping station profiles from a plurality of remote pumping stations;
   receive, in response to requesting the pumping station profile, the pumping station profile;
   update based on current operating conditions the pumping station profile based on a user selected one of a number of possible pumping station profiles to produce an updated pumping station profile;

reconfigure the remote pumping station by sending the updated pumping station profile to the remote pumping station to update a configuration of a controller of the remote pumping station according to the updated pumping station profile; and operate the at least one pump and at least one sensor of the remote pumping station using the controller.

* * * * *